April 10, 1951          C. L. UTHAUG          2,548,083
AUTOMATIC TRIP ACTUATING MEANS FOR DUMPING HAYRAKES
Filed Oct. 11, 1945          3 Sheets-Sheet 1
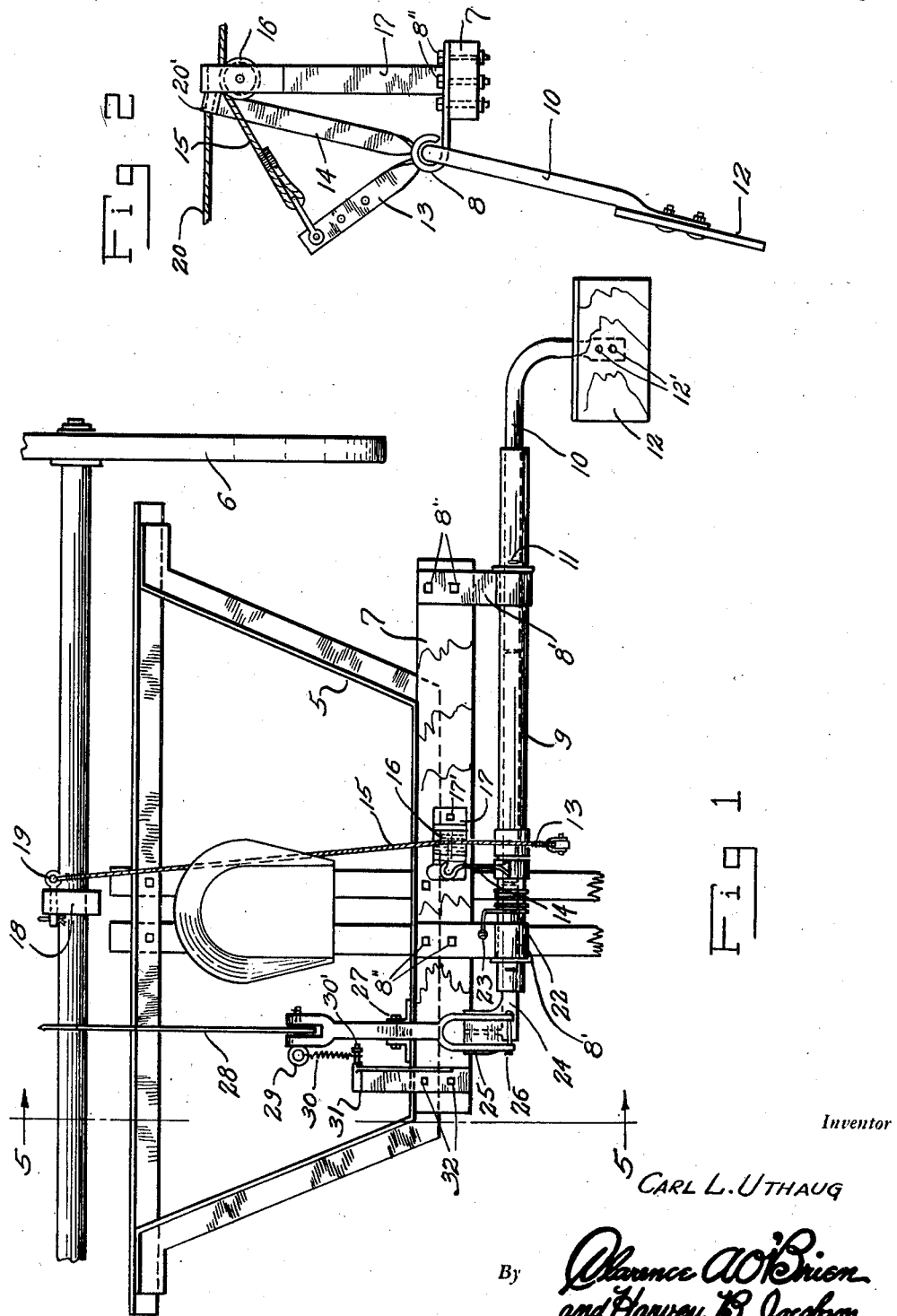
Inventor
CARL L. UTHAUG
By Clarence A. O'Brien
and Harvey B. Jacobson
Attorneys

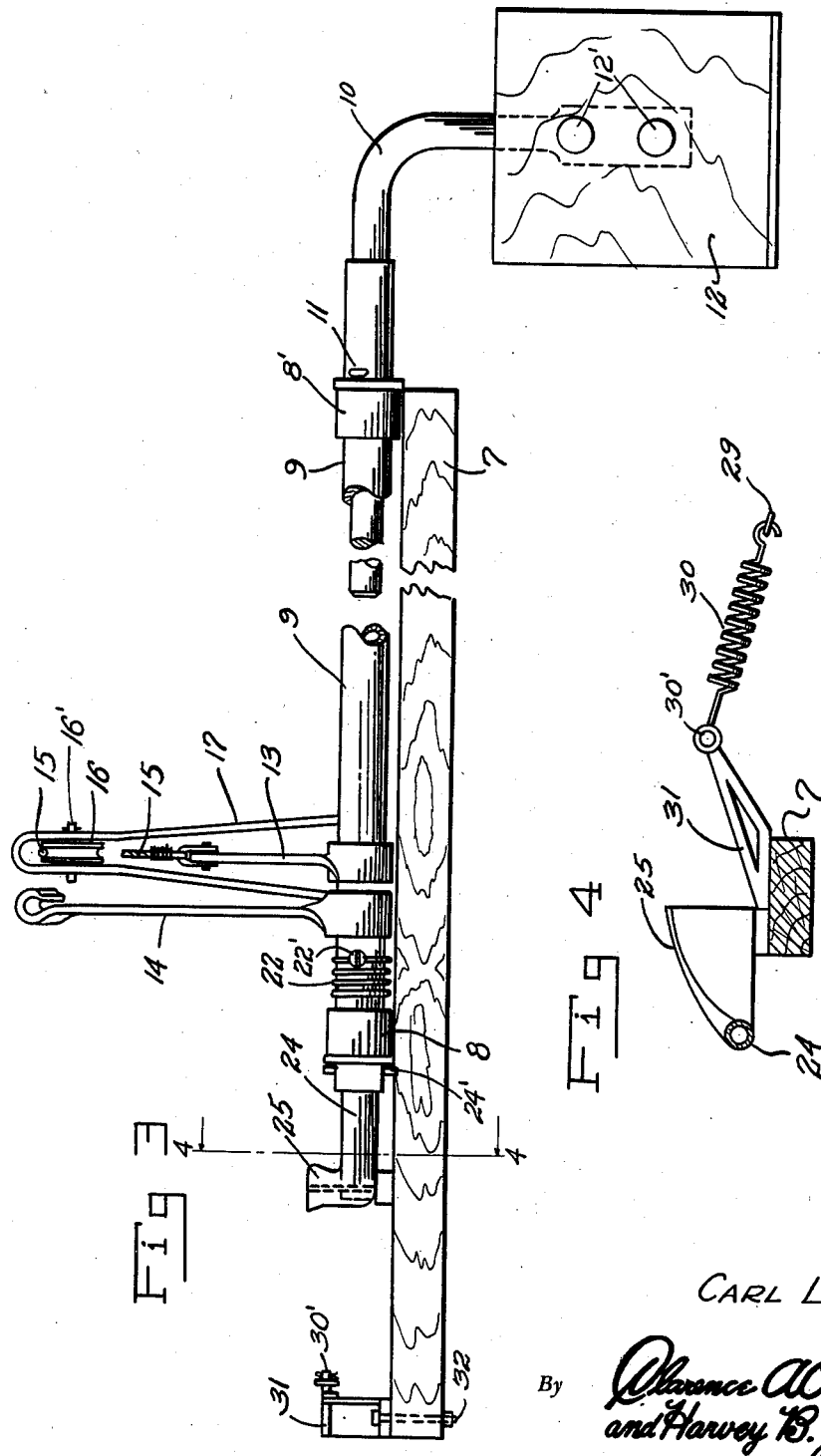

April 10, 1951 C. L. UTHAUG 2,548,083
AUTOMATIC TRIP ACTUATING MEANS FOR DUMPING HAYRAKES
Filed Oct. 11, 1945 3 Sheets-Sheet 3

Inventor
CARL L. UTHAUG

By Clarence A. O'Brien
and Harvey B. Jacobson
Attorneys

Patented Apr. 10, 1951

2,548,083

UNITED STATES PATENT OFFICE 2,548,083

AUTOMATIC TRIP ACTUATING MEANS FOR DUMPING HAYRAKES

Carl L. Uthaug, Jordan, Mont.

Application October 11, 1945, Serial No. 621,803

2 Claims. (Cl. 56—386)

The present invention relates to new and useful improvements in hay rakes and more particularly to means for automatically tripping the rake to dump the hay or other material gathered by the rake in the windrows.

An important object of the present invention is to provide means for converting a manually operated hay rake to automatic operation, thus making it possible to draw the rake behind power equipment without requiring an extra operator and with very little added attention. The invention is adapted particularly to the simultaneous mowing and windrowing of feed crops thereby eliminating the usual lapse of time between mowing and raking and conserving a lot of otherwise lost feed value due to drying out of the feed in the sun.

A further object of the invention is to provide an automatic hay rake trip embodying the use of a trip paddle or board adapted for engagement by a previously formed windrow for tripping the rake whereby to dump subsequent loads in line with the windrow.

A still further object is to provide an apparatus of this character of simple and practical construction, which may be easily and quickly installed in operative position upon a conventional form of hay rake without necessitating any material changes or alterations in the construction thereof, and which at the same time is efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary top plan view of a hay rake with the automatic trip mounted in position thereon.

Figure 2 is an end elevational view of the automatic trip attachment.

Figure 3 is an enlarged detail view in front elevation partly broken away.

Figure 4 is a fragmentary enlarged view in side elevation partly in section illustrating the foot hold down releasing cam and taken on line 4—4 of Figure 3.

Figure 5:
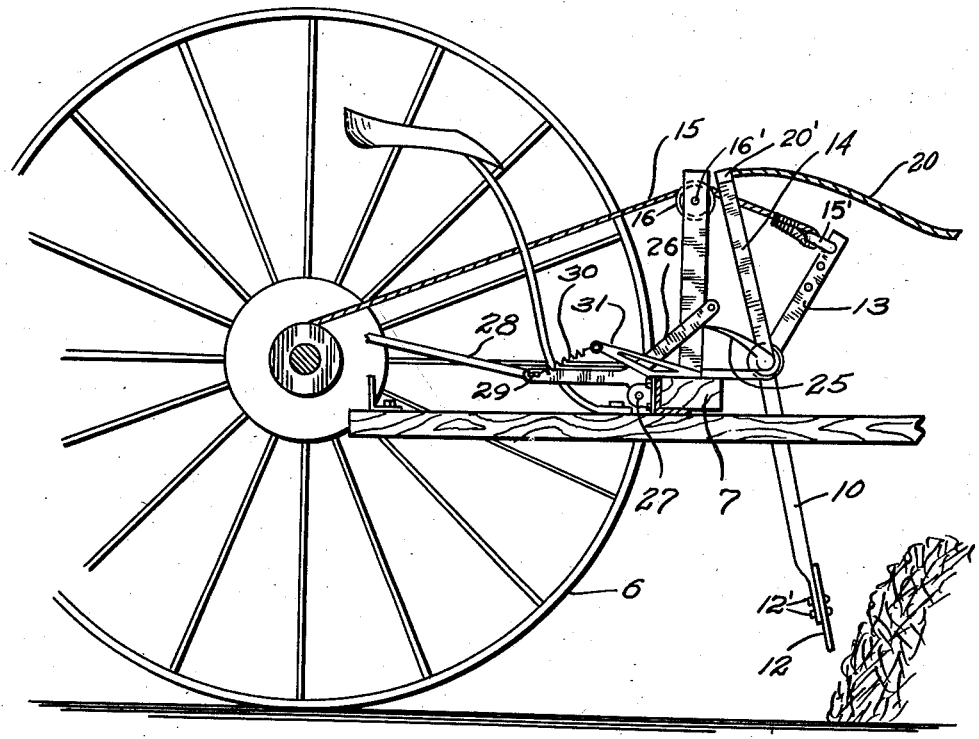
Figure 5 is a sectional view taken on a line 5—5 of Figure 1.

Referring now to the drawings in detail wherein for the purpose of illustration I have disclosed a preferred embodiment of the invention, the numeral 5 designates the frame generally of a conventional form of hay rake mounted on wheels the left one of which is shown solely, and designated 6, the rake being adapted for drawing behind power equipment, such as a mower.

A transverse beam 7 is secured to the front portion of the frame 5 in any suitable manner, the beam having a pair of bearing brackets 8, 8', respectively, secured by bolts 8" thereto. A tubular shaft 9 is rotatably mounted in the bearing brackets 8, 8', the shaft likewise extending transversely of the rake.

An arm 10 has one end secured in one end of the shaft 9 by means of a pin 11, the arm extending outwardly beyond the line of travel of the left wheel 6 of the rake and being curved downwardly and provided with a transversely extending trip board 12 secured at its lower end as by bolts 12'.

A pair of levers 13 and 14 are secured as by welding, not shown, to the shaft 9 and extend upwardly therefrom, the lever 13 having a rope or cable 15 attached by a clevis 15' to its upper end and extended rearwardly over a pulley 16 supported by a pin 16' in an elevated position above the lever 13 by means of a bracket 17 bolted, as at 17', to the beam 7. The rear end of the rope or cable 15 is attached to a conventional form of trip mechanism 18 by means of a pin 19 whereby a forward pulling force exerted on the rope or cable 15 will function to operate the trip to cause dumping the load, for instance, as disclosed in U. S. Patent No. 1,947,572, to which reference may be had for a clear understanding of such trip mechanism and dumping of such rakes.

A rope or cable 20 is also attached to the upper end of the lever 14 as indicated at 20' and extends forwardly to a position for manual operation by a person riding on the mower, not shown.

A coil spring 22 is mounted on the shaft 9 and has one end attached thereto by a screw 22', the other end of the spring being attached to the bracket 8' as indicated at 23, the spring exerting its influence on the shaft 9 to return the levers 13 and 14 rearwardly after operation by the trip board 12 through its engagement with a previously formed windrow.

An arm 24 is secured by a pin 24' in the end of the shaft 9 opposite from the arm 10, the outer end of the arm 24 being formed with a rearwardly and upwardly curved cam 25 positioned outwardly under the conventional foot hold-down pedal 26 of the rake and operating rake holddown means such as disclosed in the before mentioned patent.

The hold-down pedal 26 is pivoted intermediate its ends to the frame 5 by means of a pin 27 and a rod 28 is pivoted to the rear end of the foot hold-down pedal and extends rearwardly for operating the hold-down means in a manner which will be clear upon reference to the mentioned patent. The hold-down pedal 26 and rod 28 are pivotally connected to each other by means of a pin 29 and to which a coil spring 30 is connected at one end, the other end of the spring being attached by a stud 30' to a bracket 31 secured by bolts 32 to the beam 7, the spring exerting its influence on the hold-down pedal 26 to hold the pedal down in lieu of the operator's foot usually used to hold said pedal down.

In the operation of the device the rake is first dragged over the field and the trip manually operated by the rope or cable 20 and lever 14 to trip the rake at intervals for dumping to form the initial windrows. Thereafter as the rake continues to travel over the field the trip board 12 will engage the previously formed windrows and cause rotation of the shaft 9 in a direction to move the lever 13 forwardly thus causing a forward pull on the rope 15 to operate the trip mechanism 18 to automatically dump the rake and thus continue the formation of the windrows in line with the previously formed windrows. The cam 25 rocks the hold-down pedal 26 up to render the hold-down means ineffective each time the trip mechanism 18 is operated to cause dumping of the rake.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What is claimed is:

1. In a mobile rake of the type having a frame, a trip mechanism and a foot hold-down pedal on the frame, spring means connecting the pedal to the frame to hold said pedal down, a shaft journaled on said frame, a trip member carried by one end of the shaft for operation by a windrow formed by the rake to rotate the shaft, means operatively connecting the shaft to the trip mechanism to operate said mechanism upon rotation of said shaft by said trip member, and means carried by the shaft and underlying said pedal to engage and raise said pedal upon rotation of said shaft.

2. The combination of claim 1 wherein said last named means comprises a cam on said shaft.

CARL L. UTHAUG.

REFERENCES CITED

The following references are of record in the file of this patent:

UNITED STATES PATENTS

| Number | Name | Date |
|---|---|---|
| 68,075 | Heebner | Aug. 27, 1867 |
| 405,892 | Kennedy et al. | June 25, 1889 |
| 708,776 | Martens | Sept. 9, 1902 |
| 738,838 | Parker | Sept. 15, 1903 |
| 860,380 | Hogen | July 16, 1907 |

FOREIGN PATENTS

| Number | Country | Date |
|---|---|---|
| 820,415 | France | Aug. 2, 1937 |